(12) United States Patent
Tan et al.

(10) Patent No.: US 12,623,501 B2
(45) Date of Patent: May 12, 2026

(54) AMPHIBIOUS SNAKE ROBOT

(71) Applicant: Board of Trustees of Michigan State University, East Lansing, MI (US)

(72) Inventors: Xiaobo Tan, Okemos, MI (US); Hongyang Shi, East Lansing, MI (US); Christian Robert Luedtke, East Lansing, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 616 days.

(21) Appl. No.: 18/084,385

(22) Filed: Dec. 19, 2022

(65) Prior Publication Data

US 2023/0191861 A1 Jun. 22, 2023

Related U.S. Application Data

(60) Provisional application No. 63/291,556, filed on Dec. 20, 2021.

(51) Int. Cl.
B60F 3/00 (2006.01)
B62D 57/04 (2006.01)
(Continued)

(52) U.S. Cl.
CPC .......... B60F 3/0061 (2013.01); B60F 3/0007 (2013.01); B60F 3/0038 (2013.01);
(Continued)

(58) Field of Classification Search
None
See application file for complete search history.

(56) References Cited

U.S. PATENT DOCUMENTS 7,044,245 B2 * 5/2006 Anhalt ................... B62D 57/00
180/9.1
7,865,268 B2 1/2011 Valdivia y Alvarado et al.
(Continued)

FOREIGN PATENT DOCUMENTS

CN 113386929 A 9/2021
EP 2390066 A2 11/2011
(Continued)

OTHER PUBLICATIONS

Paap et al (GMD-Snake: A Semi-Autonomous Snake-like Robot; 1996) (Year: 1996).*
(Continued)

*Primary Examiner* — Juan G Flores
(74) *Attorney, Agent, or Firm* — Harness, Dickey & Pierce, P.L.C.

(57) ABSTRACT

An amphibious robot is provided. An aspect of the robot includes an elongated flexible body, actuators in the flexible body and spaced apart along a length of the flexible body. The actuators are configured to move the flexible body in a serpentine or concertina motion on land and in water. An additional aspect includes a camera coupled adjacent to an end of the flexible body, at least one sensor coupled to the flexible body, and a buoyancy controller located in the flexible body. Another aspect includes a power source coupled to the flexible body and configured to power the actuators, the camera, the sensors, and the buoyancy controller. Yet another aspect employs an electric controller to control the actuators and receive data from the sensors.

32 Claims, 16 Drawing Sheets

(51) Int. Cl.
| | |
|---|---|
| B63B 39/03 | (2006.01) |
| B63B 79/10 | (2020.01) |
| B63H 1/36 | (2006.01) |
| B63H 21/17 | (2006.01) |
| B63H 23/22 | (2006.01) |

(52) U.S. Cl.
CPC .............. B62D 57/04 (2013.01); B63B 39/03 (2013.01); B63B 79/10 (2020.01); B63H 1/36 (2013.01); B63H 21/17 (2013.01); B63H 23/22 (2013.01)

(56) References Cited

U.S. PATENT DOCUMENTS

| | | | |
|---|---|---|---|
| 9,687,981 B2 * | 6/2017 | Hafenrichter | ............ B25J 18/06 |
| 9,718,523 B2 | 8/2017 | Tan et al. | |
| 2006/0070775 A1 * | 4/2006 | Anhalt | ................... B62D 57/00 180/9.1 |
| 2014/0090506 A1 | 4/2014 | Tobey | |
| 2015/0060161 A1 * | 3/2015 | Hafenrichter | ............. B64F 5/60 901/44 |
| 2021/0148503 A1 | 5/2021 | Fekrmandi et al. | |

FOREIGN PATENT DOCUMENTS

| | | | |
|---|---|---|---|
| IN | 202011055868 | | 3/2021 |
| WO | WO-2006/036067 A2 | | 4/2006 |
| WO | WO-2010/142026 A1 | | 12/2010 |
| WO | WO-2016/120071 A1 | | 8/2016 |
| WO | WO-2019/073489 A1 | | 4/2019 |

OTHER PUBLICATIONS

Qi, W., et al., "A Novel Pneumatic Soft Snake Robot Using Traveling-Wave Locomotion in Constrained Environments," *IEEE Robotics and Automation Letters*, vol. 5, No. 2 (Apr. 2020).

Sverdrup-Thygeson, J., et al., "The Underwater Swimming Manipulator—A Bio-Inspired AUV," Downloaded from IEEE Xplore on Sep. 29, 2021.

Crespi, A., et al., "AmphiBot I: An amphibious snake-like robot," *Robotics and Autonomous Systems*, vol. 50, No. 4, pp. 163-175 (2005).

Crespi, A., et al., "AmphiBot II: An Amphibious Snake Robot that Crawls and Swims using a Central Pattern Generator," Proceedings of the 9th International Conference on Climbing and Walking Robots, Brussels, Belgium (Sep. 2006).

Kakogawa, A., et al., "A Multi-Link In-Pipe Inspection Robot Composed of Active and Passive Complaint Joints," IEEE/RSJ International Conference on Intelligent Robots and Systems (IROS) (Oct. 25-29, 2020).

Dertien, E., et al., "Development of an inspection robot for small diameter gas distribution mains," IEEE International Conference on Robotics and Automation, Shanghai International Conference Center (May 9-13, 2011).

Suryavanshi, K., et al., Omnidirectional Three Module Robot Design and Simulation, IEEE 19th International Conf. on Advanced Robotics (2019).

Alzuhiri, et al., "An Electronically Stabilized Multi-Color Multi-Ring Structured Light Sensor for Gas Pipelines Internal Surface Inspection," IEEE Sensor Journal, vol. 21, No. 17 (Sep. 1, 2021).

Vacariu, P., "Pirate Robot Autonomous Navigation Through Complex Pipe Networks Using Reinforcement Learning," Robotics and Mechatronics (Sep. 2021).

* cited by examiner

AMPHIBIOUS SNAKE ROBOT

CROSS-REFERENCE TO RELATED APPLICATIONS

The present application claims priority to U.S. provisional patent application Ser. No. 63/291,556 filed on Dec. 20, 2021, which is incorporated by reference herein.

BACKGROUND

The present application relates generally to a mobile sensing apparatus and more particularly to an amphibious robotic snake for mobile sensing.

Robots capable of moving underwater for surveillance, monitoring, and sensing of various conditions are generally known. An underwater robot is described in International Patent Application Publication No. WO 2016/120071 entitled "Underwater Manipulator Arm Robot" filed on Jan. 13, 2016; U.S. Pat. No. 9,718,523 entitled "Gliding Robotic Fish Navigation and Propulsion" filed on Oct. 23, 2014; and U.S. Pat. No. 7,865,268 entitled "Mechanical Fish Robot Exploiting Vibration Modes for Locomotion" filed Jun. 23, 2005. Additionally, robotic snakes capable of moving in dry environments are described in European Patent No. 2390066 entitled "Robotic Snakes for Use in Non-Destructive Evaluation and Maintenance Operations" filed May 13, 2011, and International Patent Application Publication No. WO 2006/036067 entitled "A Controllable Articulated element and a Robotic Snake Including a Skin Structure and Fire Extinguishing Nozzle" filed Sep. 26, 2005. These patent applications and patents are all incorporated by reference herein. While the commonly invented U.S. Pat. No. 9,718,523 is a significant advance in the industry, further improvements are now desirable.

SUMMARY

In accordance with the present invention, an amphibious robot is provided. An aspect of the robot includes an elongated flexible body, actuators in the flexible body and spaced apart along a length of the flexible body. The actuators are configured to move the flexible body in a serpentine or concertina motion on land and in water. An additional aspect includes a camera coupled adjacent to an end of the flexible body, at least one sensor coupled to the flexible body, and a buoyancy controller located in the flexible body. Another aspect includes a power source coupled to the flexible body and configured to power the actuators, the camera, the sensors, and the buoyancy controller. Yet another aspect employs an electric controller to control the actuators and receive data from the sensors.

In accordance with the present invention, an amphibious robot is provided. An aspect of the robot includes an elongated flexible body having a first end and a second end. The flexible body includes a plurality of body segments. An additional aspect includes an actuator located in each of the body segments and at least one cable coupled to the actuator. The actuator is configured to actuate the at least one cable between a first direction and a second direction to move the flexible body in a serpentine or concertina motion on land and in water. Another aspect includes at least one cover defining an interior space within which are the actuator and the at least one cable.

In accordance with the present invention, an amphibious robot is provided. An aspect of the robot includes an elongated flexible body having a first end and a second end, actuators in the flexible body and spaced apart along a length of the flexible body, and at least two cables coupled to each of the actuators. The actuators are configured to actuate the cables such that the flexible body is configured to move in a serpentine or concertina motion on land and in water. An additional aspect includes a camera coupled adjacent to the first end of the flexible body, at least one sensor coupled to the flexible body, a buoyancy controller located in the flexible body, and a power source coupled to the flexible body. The power source is configured to power the actuators, the camera, the sensors, and the buoyancy controller. Another aspect includes an electric controller configured to control the actuators and receive data from the sensors. Yet another aspect includes a transmitter and receiver coupled adjacent to the second end of the flexible body opposite the camera. The transmitter and receiver is configured to send data to and receive data from an external device.

The present systems, apparatuses, and methods are advantageous over prior constructions. For example, the present systems, apparatuses, and methods allow for mobility across various terrains and in water environments. A flexible exterior is also provided, enabling mobility through narrow or other constraining environments. Additional advantages and features will be disclosed in the following description and claims as well as in the appended drawings.

DETAILED DESCRIPTION

Figure 1:
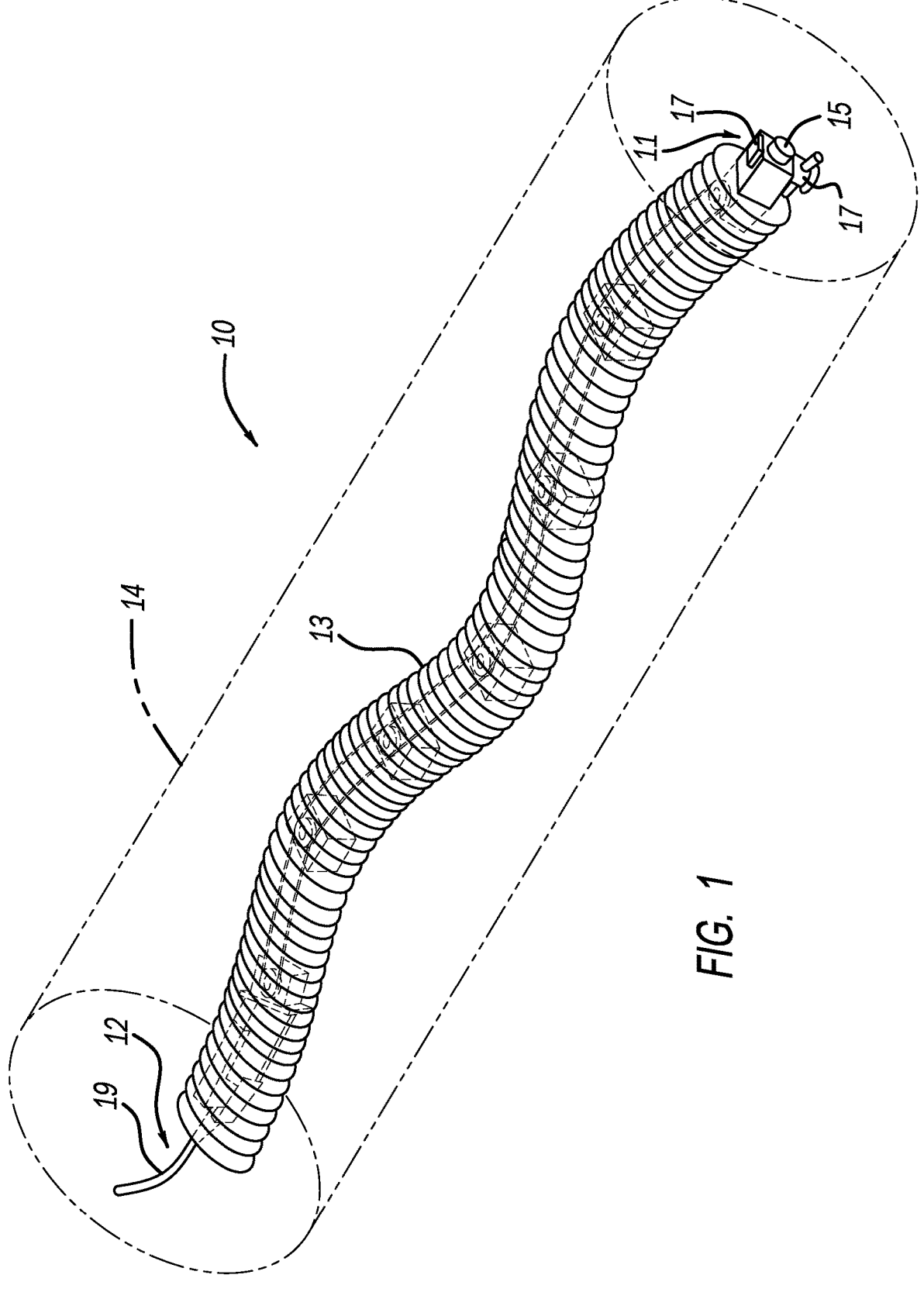
FIG. 1 is a perspective view showing an embodiment of the present amphibious snake robot.

An embodiment of an amphibious, robotic snake 10 is illustrated in FIG. 1. Robotic snake 10 includes a flexible body 13 having a first end 11 and a second end 12. The flexible body 13 comprises a soft, flexible material, such as a silicone material. The flexible body 13 also comprises a corrugated or bellows-type exterior including multiple alternating curved peaks and valleys. The corrugated exterior of the flexible body 13 allows the robotic snake 10 to grip the surface on which it is moving to propel the robotic snake 10 forward. For example, the peaks of the corrugated exterior of the flexible body 13 grip the interior of an underground pipe workpiece, such as a pipe 14, through which the robotic snake 10 is internally traveling. Additionally, the corrugated exterior of the flexible body 13 may aid in navigating the robotic snake 10 through the pipe 14, which may be corrugated. For example, the robotic snake 10 may be configured to count ridges or grooves within the corrugated pipe 14 through which the robotic snake 10 is traveling. Each groove within the pipe 14 has a width which may be multiplied by the number of grooves counted as the robotic snake 10 travels to estimate the distance through the pipe 14 the robotic snake 10 has traveled and/or the location of the robotic snake 10 within the pipe 14.

Figure 2:
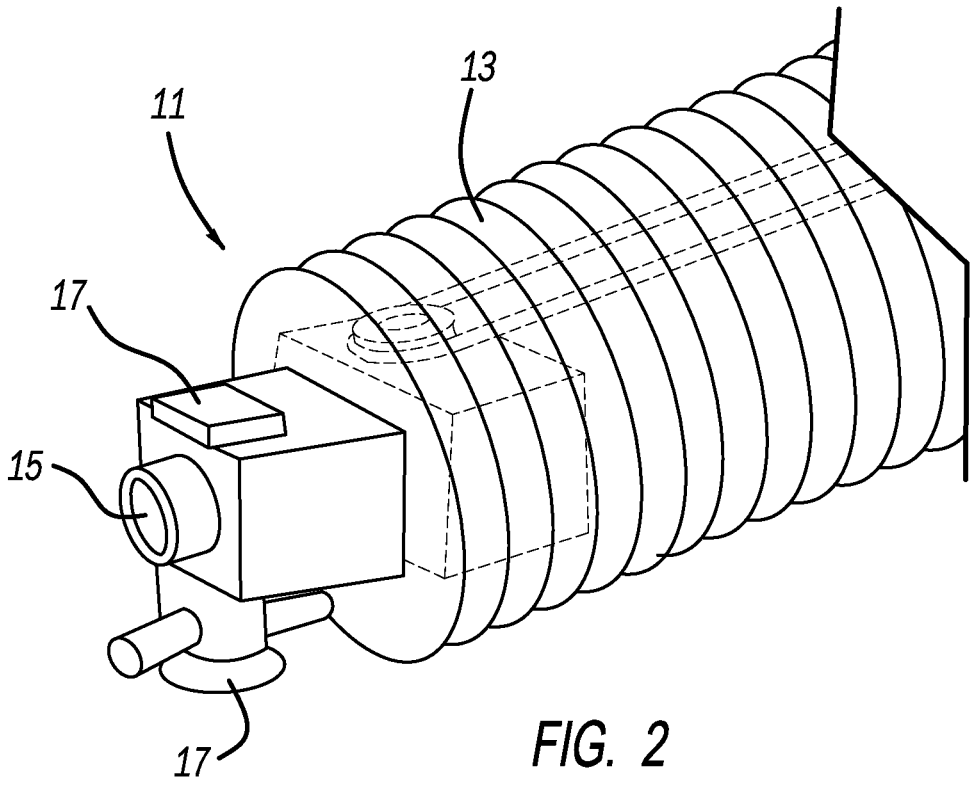
FIG. 2 is a perspective view of a first end of the amphibious snake robot of FIG. 1.
Figure 3:
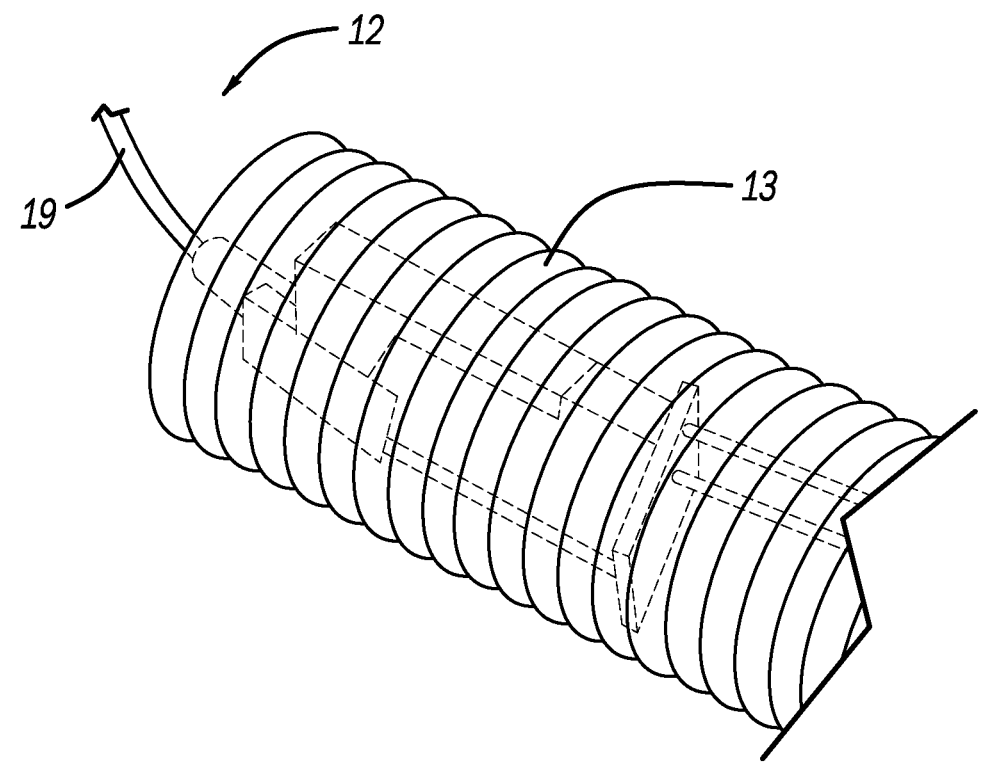
FIG. 3 is a perspective view of a second end of the amphibious snake robot of FIG. 1.

With reference to FIGS. 2-3, the first end 11 of the flexible body 13 includes a camera 15 and one or more sensors 17. The camera 15 is configured to capture and process images as the robotic snake 10 navigates through an environment. For example, the camera 15 may be used for inspecting the environment or infrastructure, such as drainage pipes. The camera 15 may also be configured to aid in navigating the robotic snake 10 through the environment. For example, the camera 15 may be configured to count the number of grooves within the corrugated pipe 14 that the robotic snake 10 has traversed to estimate the distance through the pipe 14 the robotic snake 10 has traveled and/or the location of the robotic snake 10 within the pipe 14. The sensors 17 may include one or more of a temperature sensor, a flow rate sensor, a pressure sensor, and a nitrate sensor. For example, the sensors 17 may be configured to detect nitrate levels within soil or drainage pipes. The sensors 17 may also be able to detect a liquid flow rate and/or a liquid volume through the pipes.

The second end 12 of the robotic snake 10 includes a communications transmitter and receiver 19 and, as shown in FIGS. 4A-4D, an electronics section 27. For example, the transmitter and receiver 19 may include a wire or cable extending from the second end 12 of the robotic snake 10, as shown in FIGS. 1, 3, and 4A-4D. The transmitter and receiver 19 allows for communication of the data from the camera 15 and the sensors 17. The transmitter and receiver 19 may send the data to an external device. The external device may include a laptop computer, a desktop computer, a server, a smartphone, or any other electronics device. The robotic snake 10 may also include a GPS unit configured to send a location of the robotic snake 10 to a base station.

Referring to FIGS. 4A-4D, the robotic snake 10 includes actuators, such as motors 23, spaced apart along a length of the flexible body 13 and elongated cables 25 coupled to the motors 23. In at least one example embodiment, the motors 23 comprise electric motors. Each of the motors 23 may be positioned on a mount, such as a mount 24. Each of the cables 25 may be looped around or coupled to one of the motors 23 on a first end and looped around or coupled to another adjacent motor 23 on a second end. In another exemplary embodiment, each of the cables 25 may be looped around or coupled to one of the motors 23 on the first end and coupled to the mount 24 of an adjacent motor 23 on the second end. The cables 25 are also coupled to one or both of the first end 11 and the second end 12 of the flexible body 13. For example, the cables 25 may be configured to be coupled to one of the motors 23 on the first end 11 and coupled to the electronics section 27 on the second end 12. In other embodiments, the cables 25 may be coupled to one of the motors 23 on both the second end 12 and the first end 11. In another exemplary embodiment, each of the cables 25 may comprise two cables with a first end of each of the cables 25 configured to be coupled to one of the motors 23 and a second end of each of the cables 25 configured to be coupled to an adjacent mount 24.

The motors 23 are configured to actuate the cables 25 such that the flexible body 13 is configured to move in a serpentine motion across a dry or partially dry environment, such as land, and in water. The serpentine motion, which may be similar to that of a snake or an eel, may be generated by sections of the flexible body 13 containing the motors 23 moving relative to each other, as shown in FIGS. 4A-4D. For example, a first one of the motors 23 actuates the cables 25 coupled to the first one of the motors 23 in a first direction. At the same time, a second one of the motors 23 adjacent the first motor 23 actuates the cables 25 in a second direction opposite the first direction. The alternating motion created by each of the motors 23 and the cables 25 creates the serpentine motion shown in FIGS. 4A-4D.

Additionally or alternatively, ambient structures or obstacles may aid in developing the serpentine or concertina motion of the robotic snake 10. Sides of the robotic snake 10, such as the flexible body 13, may come into contact with surrounding structures or obstacles. For example, the flexible body 13 of the robotic snake 10 may come into contact with the sides of the pipe 14 as it travels inside the pipe 14. The robotic snake 10 may use the reaction force generated by coming in contact with the sides of the pipe 14 to propel itself forward and create the serpentine or concertina motion illustrated in FIGS. 4A-4D.

The electronics section 27 is positioned adjacent the second end 12 of the flexible body 13. In other embodiments, the electronics section 27 may be positioned adjacent the first end 11 of the flexible body 13. The electronics section 27 includes a power source configured to power the motors 23, the camera 15, and the sensors 17. The electronics section 27 also includes an electronic controller configured to control the motors 23 and receive and process data from the camera 15 and the sensors 17. The transmitter and receiver 19 may also be communicatively coupled to the electronics section 27.

Additionally, the robotic snake 10 includes a buoyancy controller 28. The buoyancy controller 28 is positioned within the flexible body 13 adjacent the second end 12 as part of the electronics section 27, as shown in FIGS. 4A-4E. In other embodiments, the buoyancy controller 28 may be positioned elsewhere within the flexible body 13. For example, the buoyancy controller 28 may be positioned within the flexible body 13 adjacent one of the motors 23 or adjacent the first end 11. The power source of the electronics section 27 is also configured to power the buoyancy controller 28. The buoyancy controller 28 is configured to adjust the buoyancy of the robotic snake 10 when submersed in water. For example, the buoyancy controller 28 ensures that the robotic snake 10 maintains contact with a bottom of a pipe, such as the pipe 14 of FIG. 1, so that it may travel and maintain its serpentine motion along the bottom of the pipe.

Figures 4A, 4B:
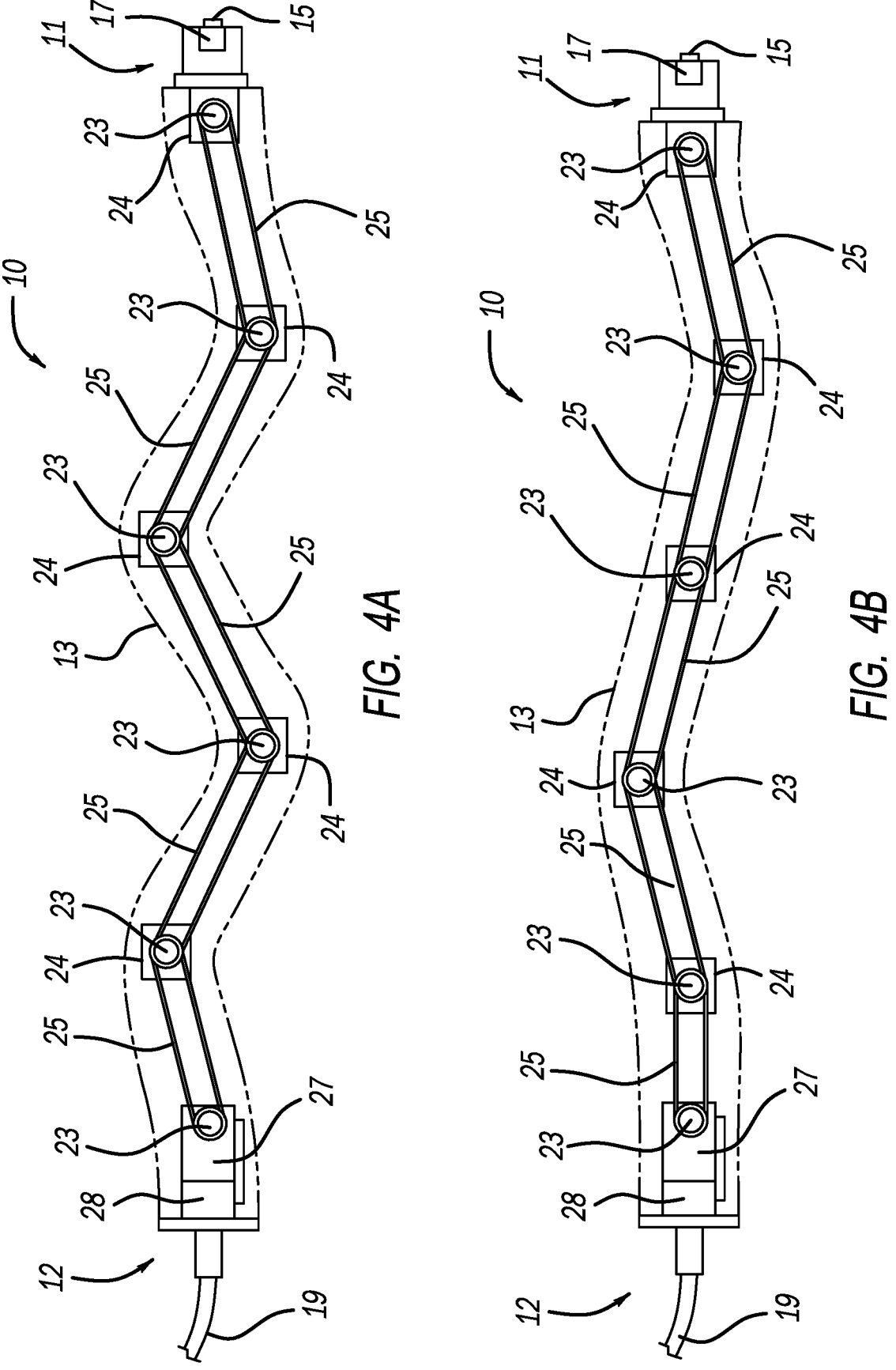
FIG. 4A is a top, diagrammatic view showing a first position of the amphibious snake robot of FIG. 1.
FIG. 4B is a top, diagrammatic view showing a second position of the amphibious snake robot of FIG. 1.
Figure 4C:
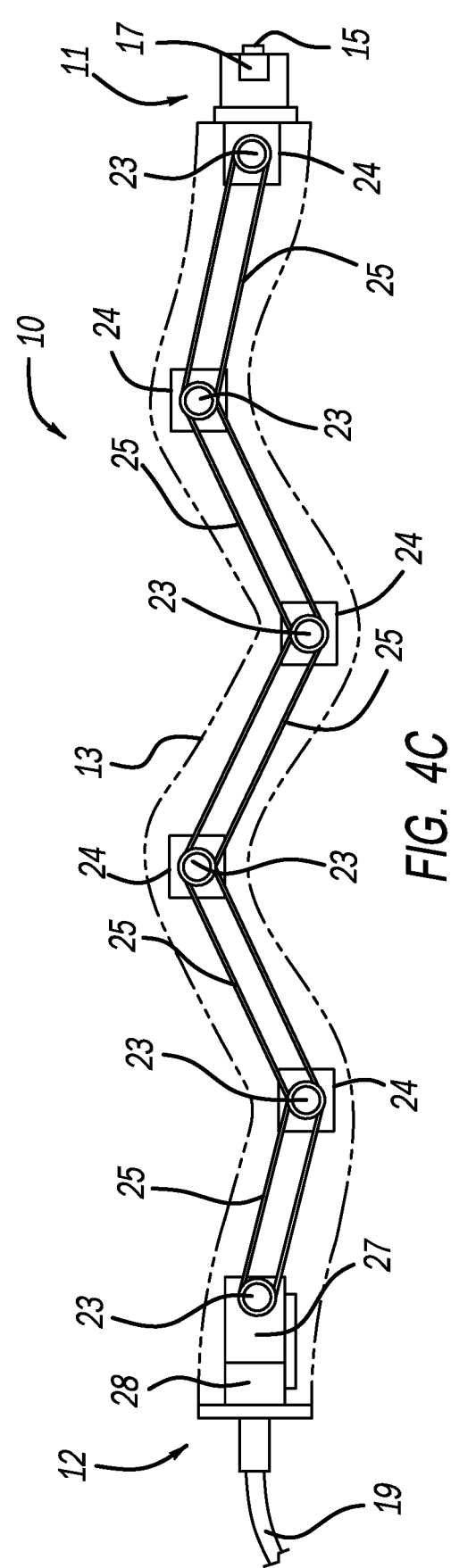
FIG. 4C is a top, diagrammatic view showing a third position of the amphibious snake robot of FIG. 1.
Figure 4D:
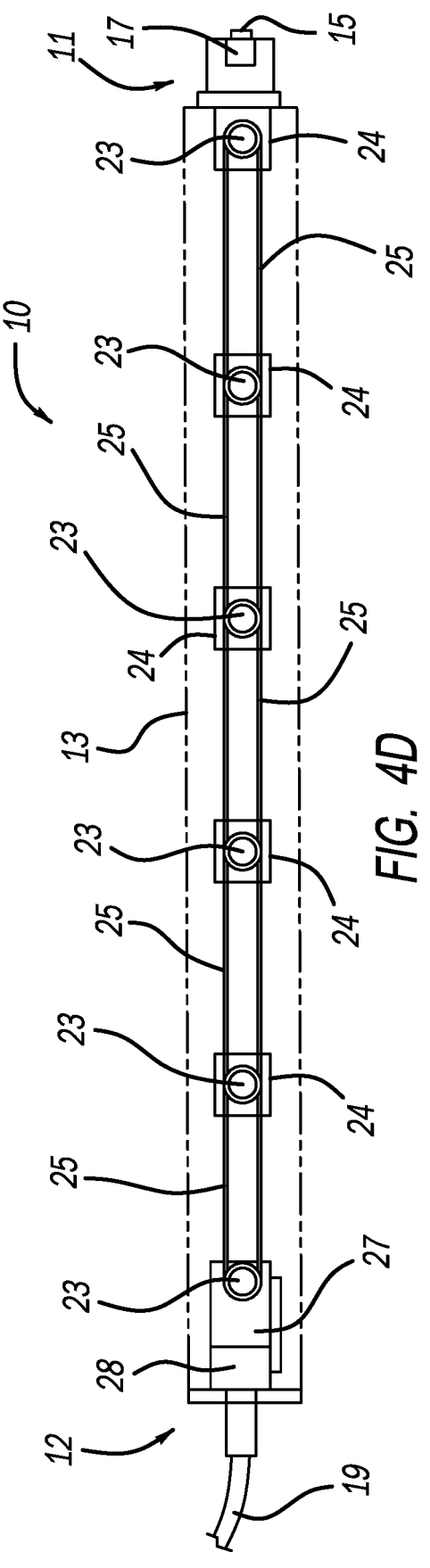
FIG. 4D is a top, diagrammatic view showing a fourth position of the amphibious snake robot of FIG. 1.
Figure 4E:
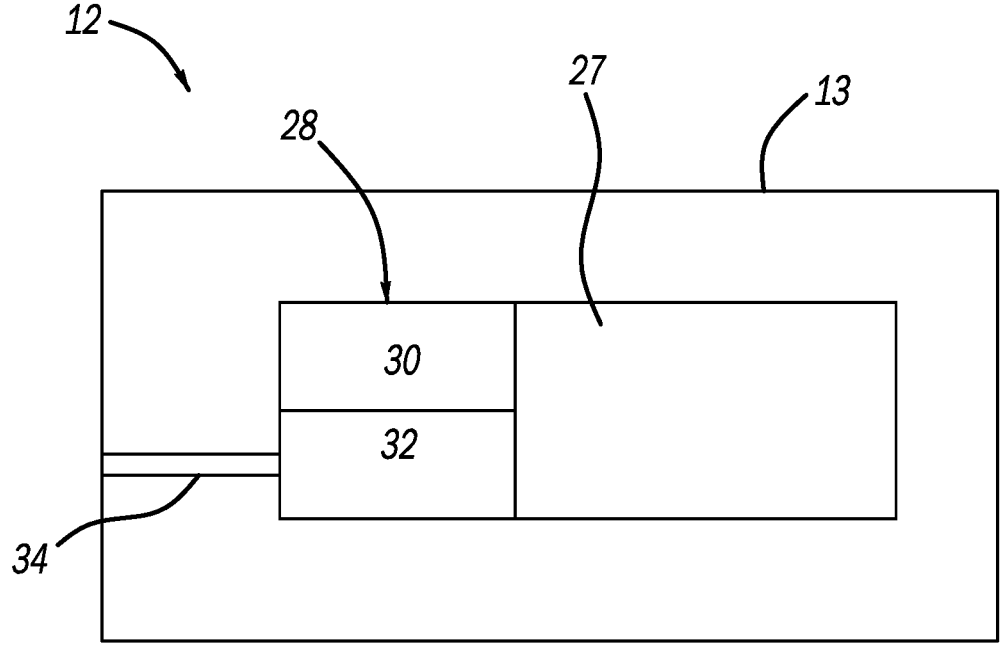
FIG. 4E is a diagrammatic view of the second end of amphibious snake robot of FIG. 1.

With reference to FIG. 4E, the buoyancy controller 28 includes a pump 30, with integrated feedback, and a ballast tank 32 coupled to the pump 30. The pump 30 may comprise a linear actuator-based pump or a rotary motor-based pump. The tank 32 may comprise a tube or conduit that extends at least partially along the length of the flexible body 13. For example, the tank 32 may extend from the second end 12 to the first end 11 of the flexible body 13 such that the buoyancy may be uniformly controlled or adjusted along the length of the robotic snake 10.

The controller of the electronics section 27 is operable to energize the pump 30 to control water volume inside the tank 32. When the surrounding pipe is filled with water, the robotic snake 10 will naturally float. The pressure sensor of the sensors 17 will detect the water depth. When the pump 30 pumps in water from outside the robotic snake 10 into the tank 32 via a port 34, it increases the weight of the robotic snake 10 and causes the robotic snake 10 to sink toward the bottom of the pipe. In some embodiments, the buoyancy of the robotic snake 10 may be controlled by pumping air into the tank of the robotic snake 10 to push out the water to lighten the weight of the robotic snake 10. In other embodiments, the buoyancy of the robotic snake 10 may be controlled by inflating or deflating a soft pouch attached to the robotic snake 10.

Multiple pumps and tanks may be spaced apart along the longitudinal length of the robotic snake 10 to balance out its buoyancy. The pressure sensor of the sensors 17 may detect the depth of the robotic snake 10. For example, the pressure sensor of the sensors 17 detects the depth of the robotic snake 10 from the surface of the water in which it is submerged. Additionally, one or more filters may be associated with the buoyancy controller 28, such as with the port 34, for blocking silt and other matter that may be pumped into the tank 32 along with the water.

Figure 4F:
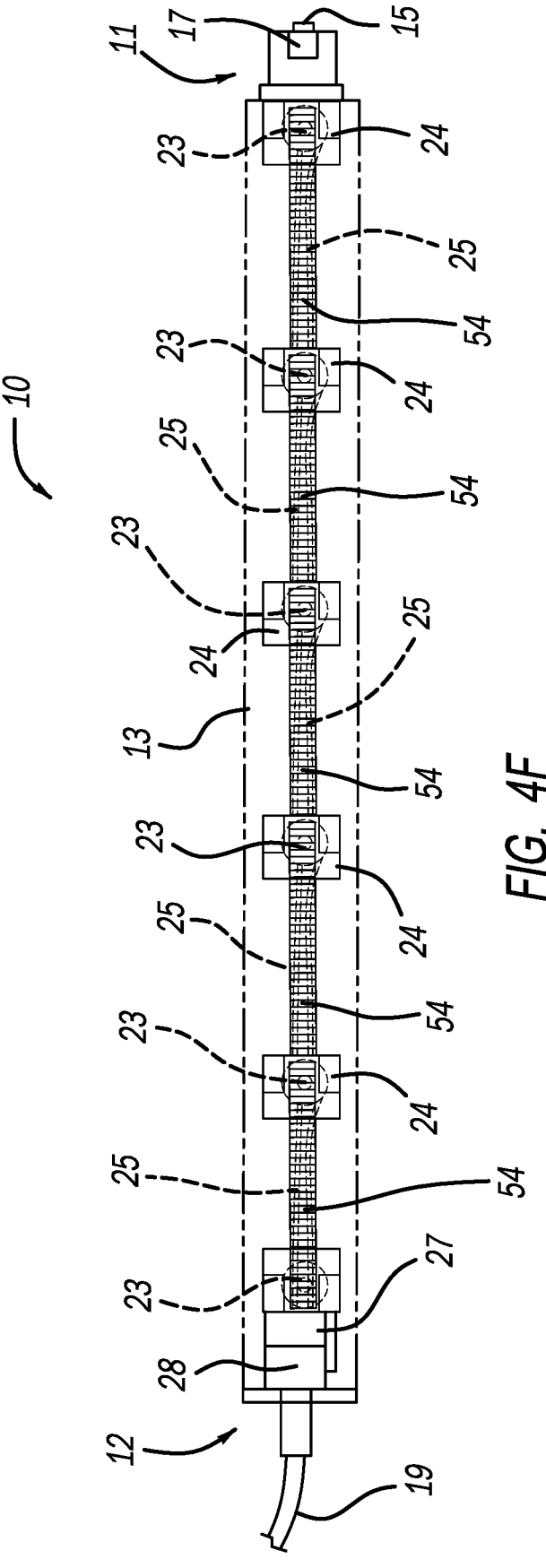
FIG. 4F is a top, diagrammatic view of another exemplary embodiment of the present amphibious snake robot.

With reference to FIG. 4F, the robotic snake 10 includes a flexible backbone 54 coupled to the cables 25 in some exemplary embodiments. The flexible backbone 54 is configured to provide sufficient stiffness and structure along the length of the robotic snake 10 while also enabling the flexible body 13 to bend and create the serpentine motion when one of the motors 23 pulls one of the cables 25 and another of the cables 25 is released. In some exemplary embodiments, at least one side of the flexible backbone 54 may comprise a corrugated or bellows shape. For example, the corrugated shape of the flexible backbone 54 may be configured to match the corrugated shape of the flexible body 13. The flexible backbone 54 may also comprise a silicone material. Additionally, the flexible backbone 54 may comprise a flexible 3D-printed material, such as a thermoplastic polyurethane material, for example.

6

Figures 5, 6A, 6B:
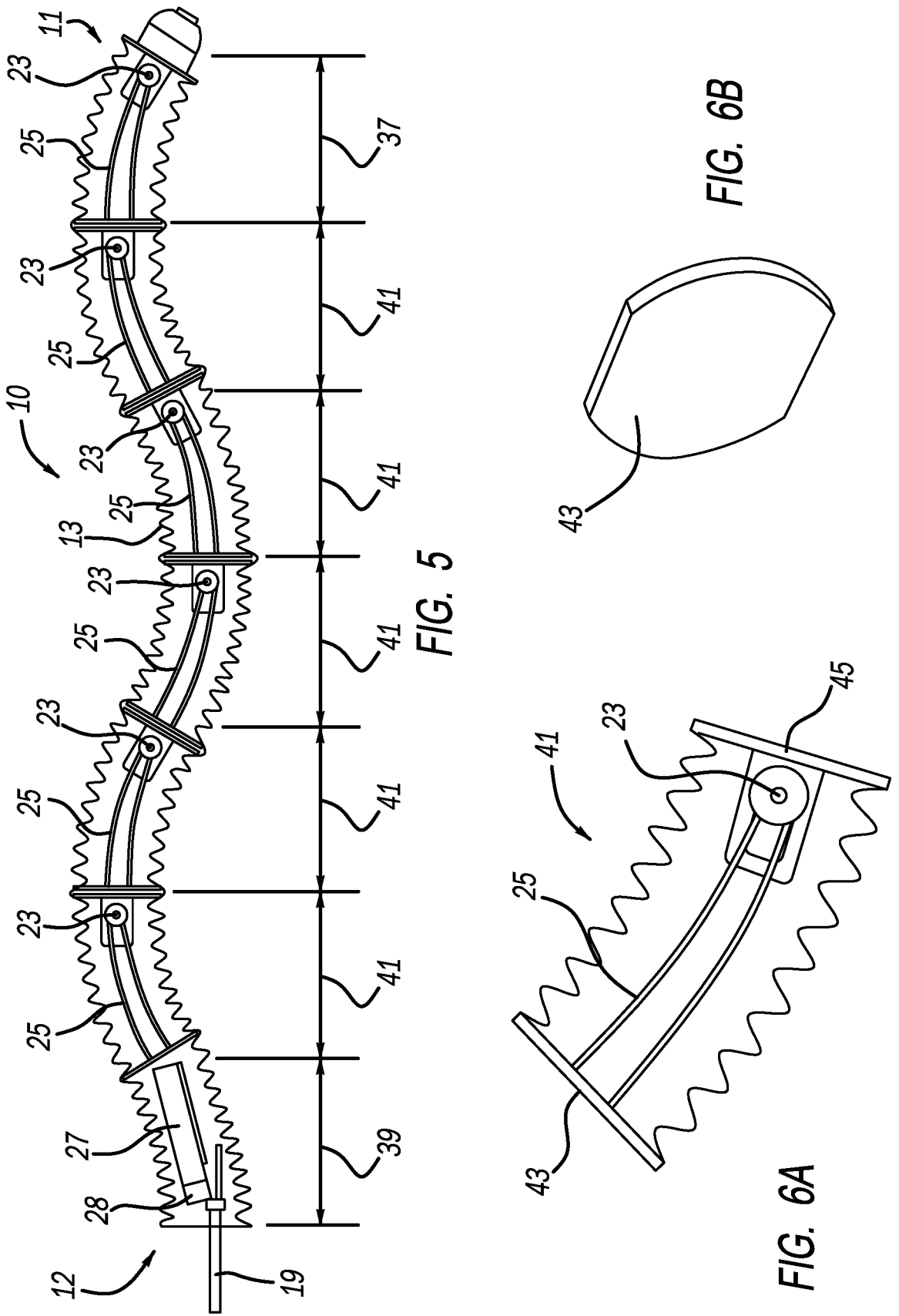
FIG. 5 is a top, diagrammatic view of another exemplary embodiment of the present amphibious snake robot.
FIG. 6A is a top, diagrammatic view of a segment of the amphibious snake robot of FIG. 5.
FIG. 6B is a perspective view of a cable anchor of the amphibious snake robot of FIG. 5.

FIG. 5 illustrates another exemplary embodiment of the robotic snake 10. The flexible body 13 of the robotic snake 10 may include a plurality of body segments including a first body segment 37 at the first end 11, a second body segment 39 at the second end 12, and one or more middle body segments 41 between the first body segment 37 and the second body segment 39. The second body segment 39 may include the transmitter and receiver 19 and the electronics section 27, as shown in FIG. 5.

Figure 6C:
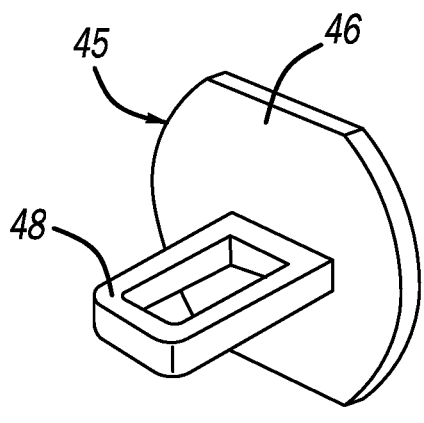
FIG. 6C is a perspective view of a motor clamp of the amphibious snake robot of FIG. 5.

FIGS. 6A-6E illustrate additional details that may be associated with the robotic snake 10 of FIG. 5. With reference to FIGS. 6A-6C, each of the middle body segments 41 includes a cable anchor 43 and a motor clamp 45. The cable anchor 43 is positioned on a first side of each middle body segment 41 and may comprise a round or ovular shape. For example, the shape of the cable anchor 43 may correspond to the interior perimeter of the flexible body 13.

The motor clamp 45 is positioned on a second side of the middle body segment 41 opposite the cable anchor 43. The motor clamp 45 includes a wall portion 46 and a clamp portion 48. The wall portion 46 may be the same as or similar to the cable anchor 43. The clamp portion 48 is attached to the wall portion 46. The clamp portion also defines an opening configured to receive one of the motors 23 and secure the motors 23 within each of the body segments. For example, the opening in the clamp portion 48 may receive the mount 24 of each of the motors 23.

In each of the middle body segments 41, the cables 25 are coupled to the motors 23 and the cable anchor 43. For example, ends of each of the cables 25 are attached to the cable anchor 43 and a middle portion of each of the cables 25 are attached to the motors 23. The middle portion of the cables 25 may be wrapped or looped around the motor 23, as shown in FIGS. 5 and 6A. Similarly, as shown in FIG. 5, the first body segment 37 also includes the motor clamp 45 and the cable anchor 43. Within the first body segment 37, one of the motors 23 is coupled to the motor clamp 45 and one of the cables 25 is coupled to the motor 23 and the cable anchor 43. In another example embodiment, the cables 25 may include at least two cables. For example, a first end of each of the cables 25 may be coupled to the cable anchor 43 and a second end of each of the cables 25 may be coupled to the motor 23.

The ends of the cables 25 are attached to the cable anchor 43 and may be equidistantly spaced apart from edges of the cable anchor 43 such that when the motor 23 actuates the cable 25 in a first direction, one of the ends of the cable 25 pulls the cable anchor 43 in the first direction. Likewise, when the motor 23 actuates the cable 25 in a second direction, the other end of the cable 25 pulls the cable anchor 43 in the second direction. Such motion in each of the middle body segments 41 and the first body segment 37 creates the serpentine motion that propels the robotic snake forward or backward.

Figure 6D:
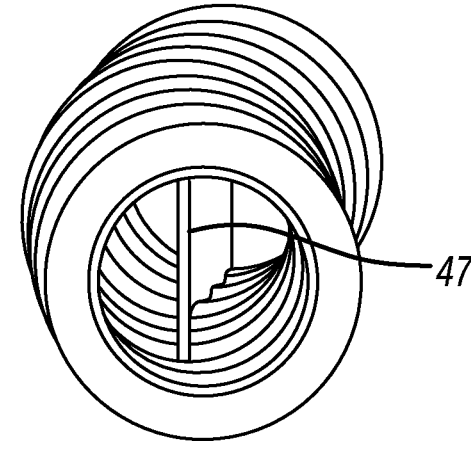
FIG. 6D is a diagrammatic, side view of a segment of the amphibious snake robot of FIG. 5.
Figure 7:
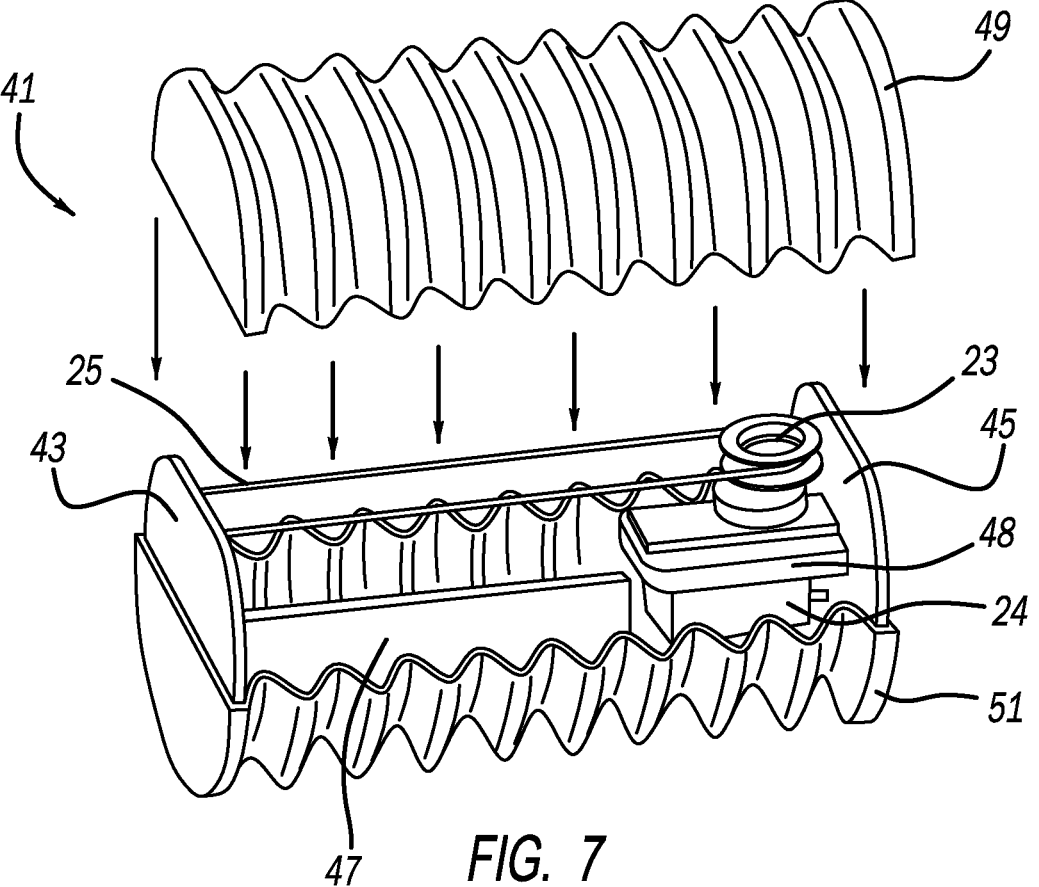
FIG. 7 is an exploded view of the amphibious snake robot of FIG. 5.

With reference to FIG. 6D, each of the first body segment 37, the second body segment 39, and the middle body segments 41 include a vertical (in the illustrated orientation) wall 47. The vertical wall 47 extends vertically along a majority of the longitudinal length of each of the first body segment 37, such as a distance of at least three corrugated peaks and more preferably at least five corrugated peaks, the second body segment 39, and the middle body segments 41 and divides each in half. For example, as shown in FIG. 7, the vertical wall 47 may extend from the cable anchor 43 to the clamp portion 48 and/or motor 23 of the motor clamp 45. The vertical wall 47 provides stiffness along the length of the robotic snake 10 while also enabling each of the body segments to bend and create the serpentine motion when one of the cables 25 is pulled and another of the cables 25 is released. The vertical wall 47 may comprise a silicone material.

Figure 6E:
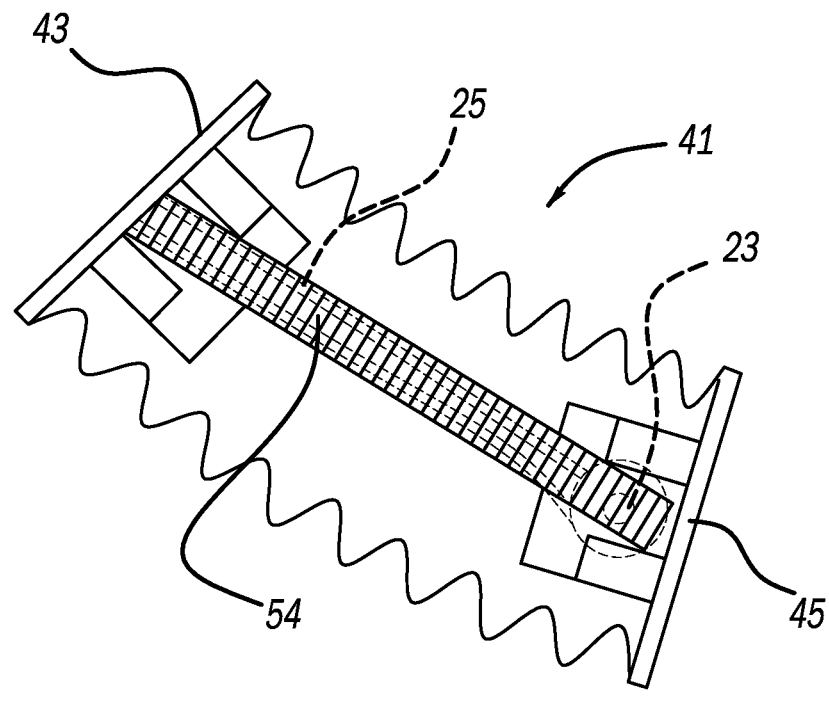
FIG. 6E is a top, diagrammatic view of a segment of the amphibious snake robot of FIG. 5.
Figure 8A:
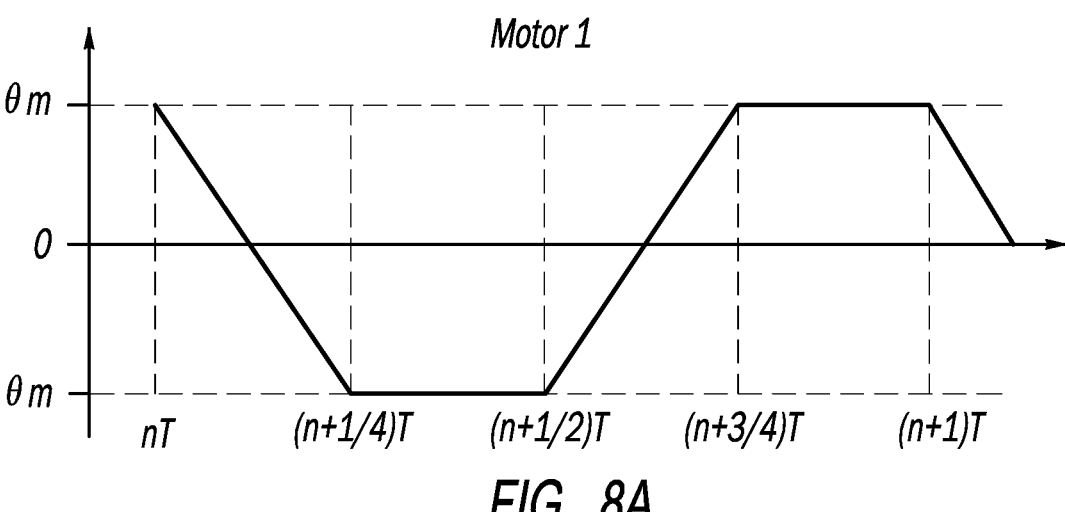
FIG. 8A is a graph illustrating activation of a first motor of the amphibious snake robot of FIG. 5.
Figure 8B:
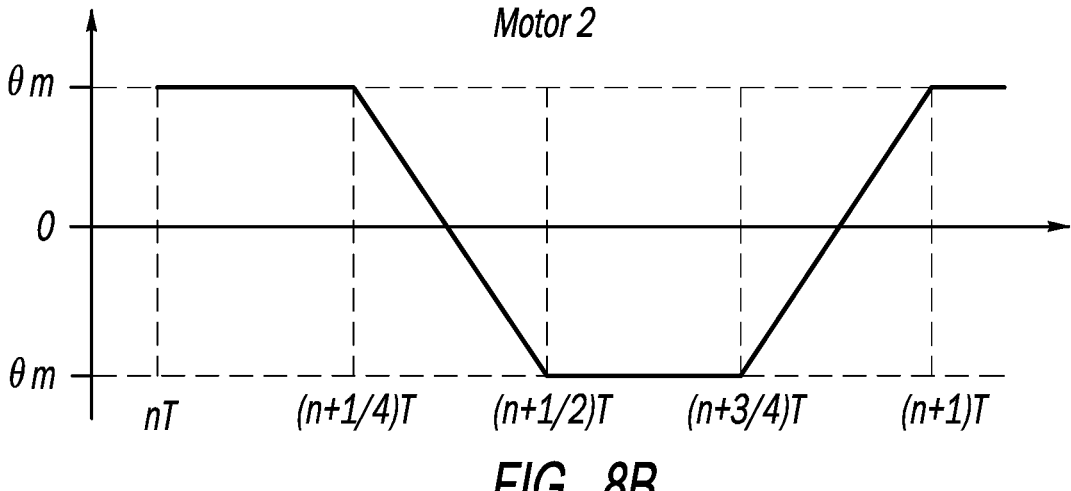
FIG. 8B is a graph illustrating activation of a second motor of the amphibious snake robot of FIG. 5.
Figure 8C:
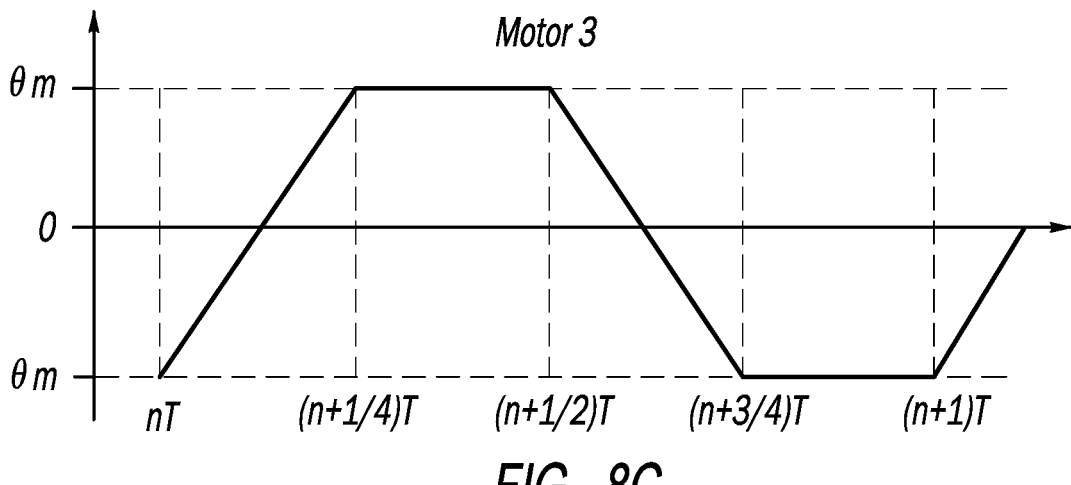
FIG. 8C is a graph illustrating activation of a third motor of the amphibious snake robot of FIG. 5.
Figure 8D:
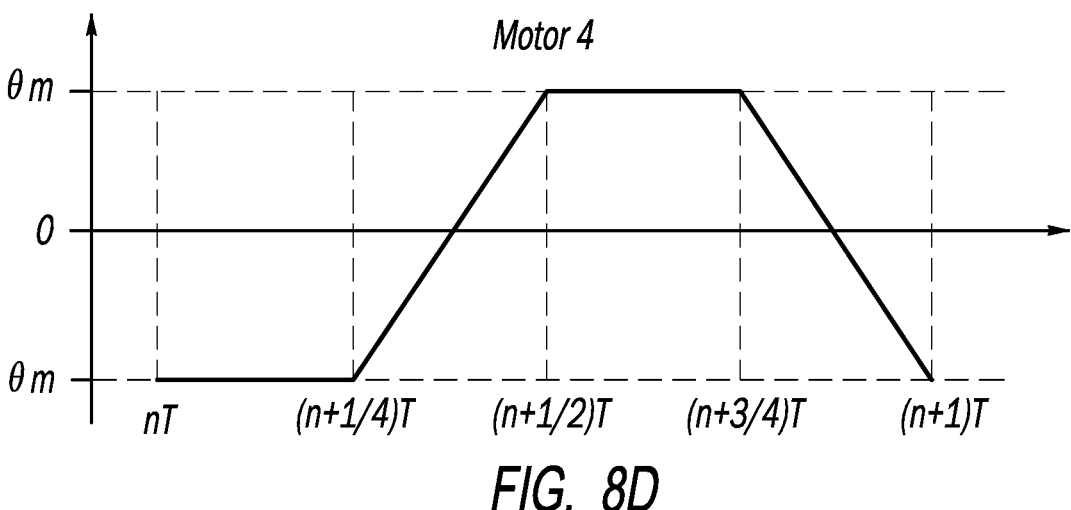
FIG. 8D is a graph illustrating activation of a fourth motor of the amphibious snake robot of FIG. 5.
Figure 8E:
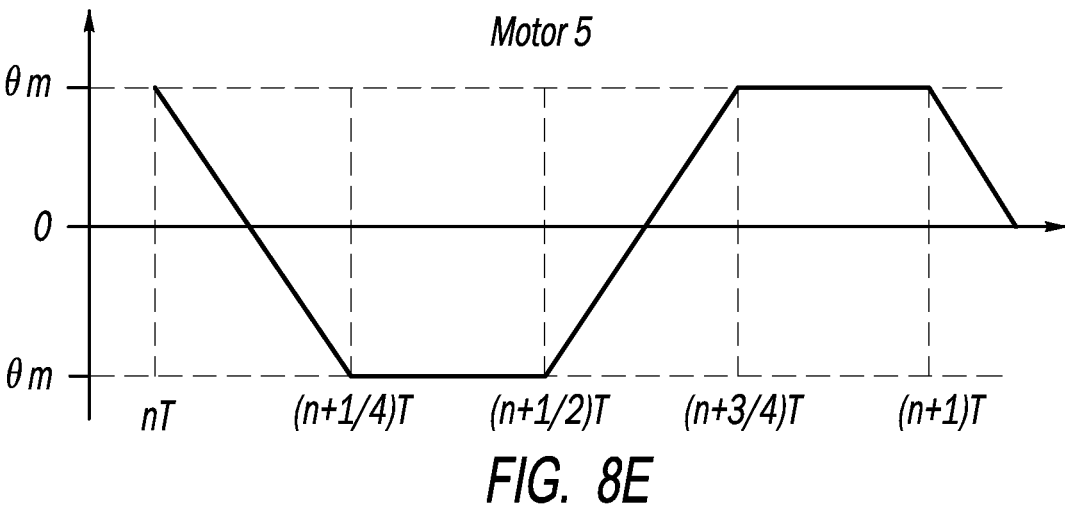
FIG. 8E is a graph illustrating activation of a fifth motor of the amphibious snake robot of FIG. 5.
Figure 8F:
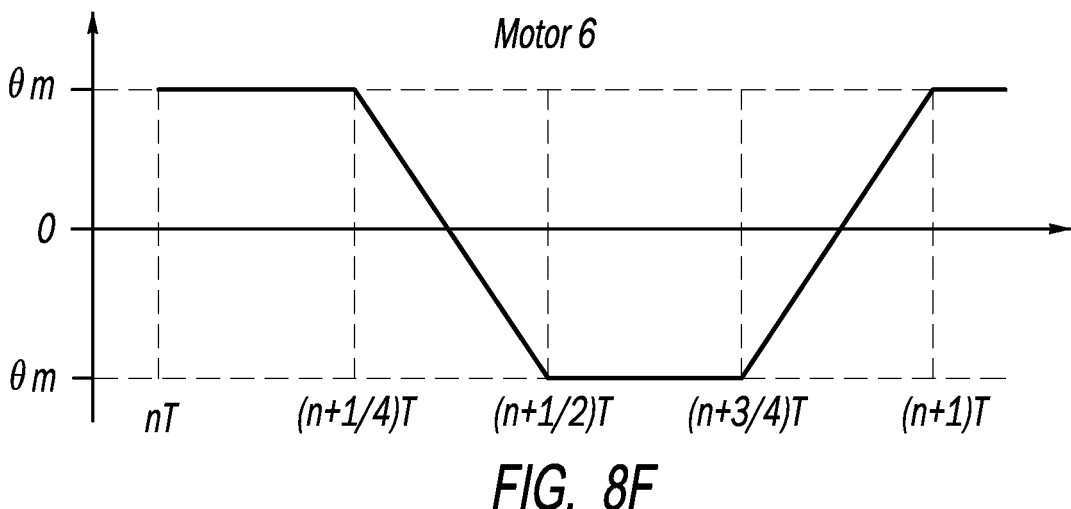
FIG. 8F is a graph illustrating activation of a sixth motor of the amphibious snake robot of FIG. 5.

With reference to FIG. 6E, each of the plurality of body segments may include a flexible backbone 54 coupled to the cables 25. The flexible backbone 54 is configured to provide sufficient stiffness and structure along the length of the robotic snake 10 while also enabling the flexible body 13 to bend and create the serpentine motion when one of the motors 23 pulls one of the cables 25 and another of the cables 25 is released. In some exemplary embodiments, at least one side of the flexible backbone 54 may comprise a corrugated or bellows shape. For example, the corrugated shape of the flexible backbone 54 may be configured to match the corrugated shape of the flexible body 13. The flexible backbone 54 may also comprise a silicone material. Additionally, the flexible backbone 54 may comprise a flexible 3D-printed material, such as a thermoplastic poly-urethane material, for example.

Each of the plurality of body segments may include a top half 49 and a bottom half 51, as shown in FIG. 7. The top half 49 and the bottom half 51 are manufactured by molding and casting. The cable anchor 43 and the motor clamp 45 are then embedded into the bottom half 51, the motor 23 is mounted to the motor clamp 45, and the cable 25 is attached to the motor 23 and the cable anchor 43. The top half 49 and the bottom half 51 are fastened together by adhesive bonding, sonic welding, heat staking or the like, and sealed to keep out water. Additionally, adjacent body sections, such as one or more of the middle body segments 41, the first body segment 37, and second body segment 39 are bonded together to achieve a desired length of the robotic snake 10.

FIGS. 8A-8F illustrate how the serpentine motion of the robotic snake 10, as shown in FIGS. 4A-4D, is achieved using the motors 23 and the cables 25. With reference to FIG. 5, each of the first body segment 37 and the middle body segments 41 can bend independently by controlling the motors 23 and the cables 25. Each of the body segments can bend bidirectionally, achieving a bending angle within a range of [−θm, θm]. The angle control signals for each of the motors 23 are shown in FIGS. 8A-8F. For example, at time nT a first motor of the motors 23 of one of the body segments reaches the maximum left bending angle θm. Then, during time nT and (n+¼)T, the first motor of the motors 23 will rotate inversely. At this time, the body segment containing the first motor of the motors 23 will bend towards the right, with the bending angle changing from θm to −θm. This position may be held for a quarter of a period, for example, and start to bend towards the left. The bending angle signals are repeated for each of the motors 23 in each of the body segments to achieve the serpentine motion of the robotic snake 10. In another exemplary embodiment, the bending angle signals may comprise a sinusoidal, trapezoidal, or any other piecewise functional shape. The bending angle may also be asymmetric in some embodiments, such as within a range of [−θ min, θ max].

In other embodiments, the serpentine motion of the robotic snake 10 may be achieved by a plurality of pneumatic actuators positioned in the flexible body 13. In still other embodiments, smart material actuators, such as shape memory alloys and twisted and coiled polymer (TCP) actuators, may produce the bending motion of each of the plurality of body segments of the robotic snake 10 to achieve the serpentine motion.

Figure 9:
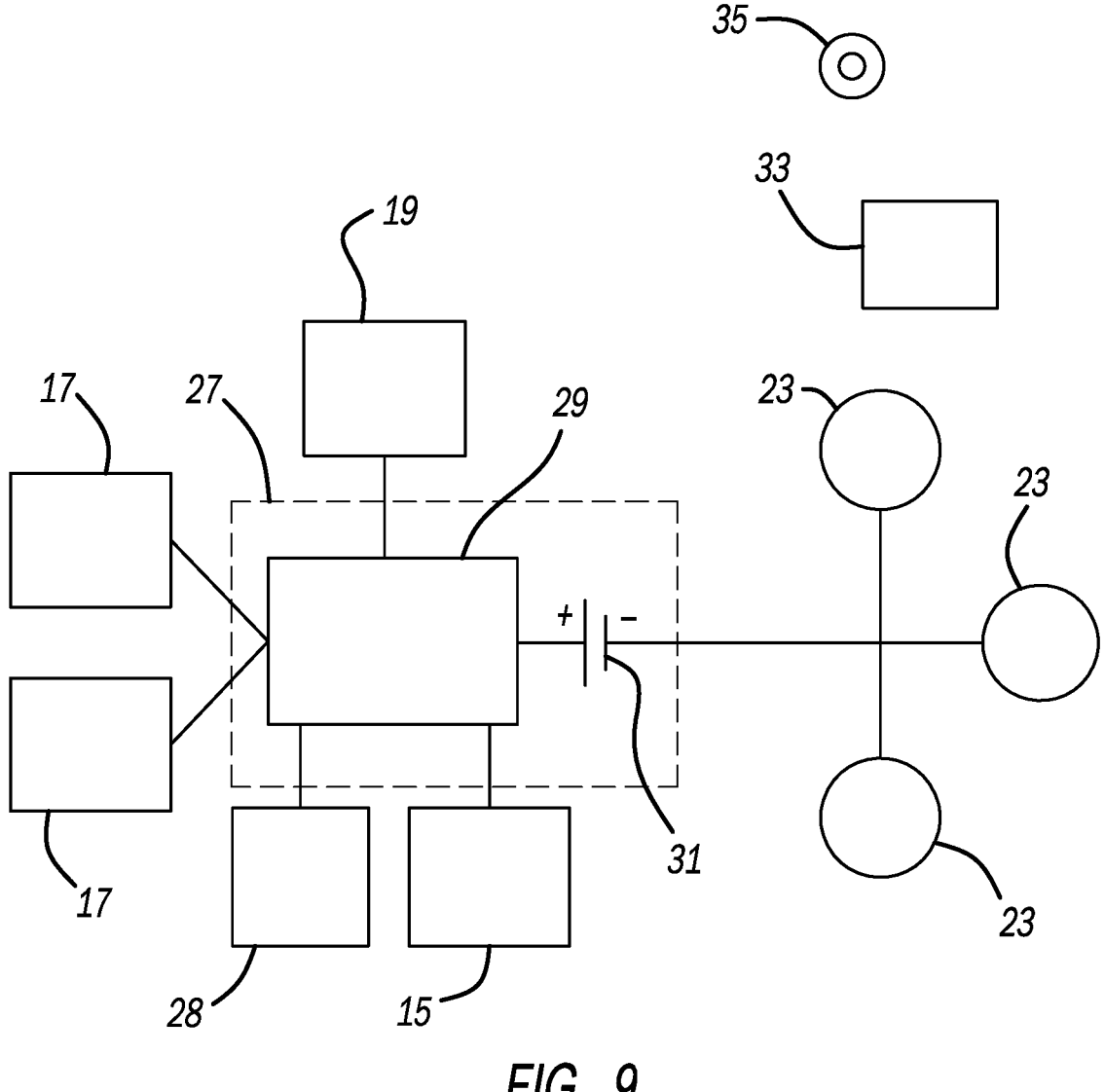
FIG. 9 is a circuit diagram of the present amphibious snake robot.

FIG. 9 is a circuit diagram illustrating additional features of the robotic snake 10. The electronics section 27 of the robotic snake 10 includes an electronic controller 29 communicatively coupled to the motors 23, sensors 17, camera 15, the buoyancy controller 28, the transmitter and receiver 19, and a power source 31. The electronic controller 29 receives data from the sensors 17 and the camera 15. The electronic controller 29 is also configured to send data to and receive data from an external device 33. For example, the electronic controller 29 sends data from the sensors 17 and the camera 15 to the external device 33 via the transmitter and receiver 19. The electronic controller 29 may also receive data and instructions, such as navigation instructions and buoyancy instructions, from the external device 33 via the transmitter and receiver 19. The external device 33 may wirelessly communicate with the transmitter and receiver 19 via Bluetooth. Additionally or alternatively, the external device 33 communicates with the transmitter and receiver 19 via Wi-Fi or Zigbee. In other embodiments, the external device 33 may be configured to be physically connected to the robotic snake 10 to send and receive data. In still other embodiments, the electronics section 27 may include a memory card, such as a secure digital (SD) card, configured to store the data received from the sensors 17 and the camera 15. The memory card may be removed and inserted into the external device 33 for retrieval of the data.

The electronic controller 29 is also configured to supply power from the power source 31 to one or more of the motors 23 to cause the robotic snake 10 to move in a serpentine motion forward or backward. For example, the power source 31 comprises a battery positioned in the flexible body 13, such as included with the electronics section 27.

The robotic snake 10 may comprise a GPS unit 35 configured to communicate with the electronics controller 29 via the transmitter and receiver 19. For example, the GPS unit 35 is positioned within the flexible body 13 of the robotic snake 10. The GPS unit 35 is configured to send a location of the robotic snake 10 to the electronics controller 29. The electronics controller 29 then communicates the location of the robotic snake 10 to the external device 33 via the transmitter and receiver 19.

Figure 10:
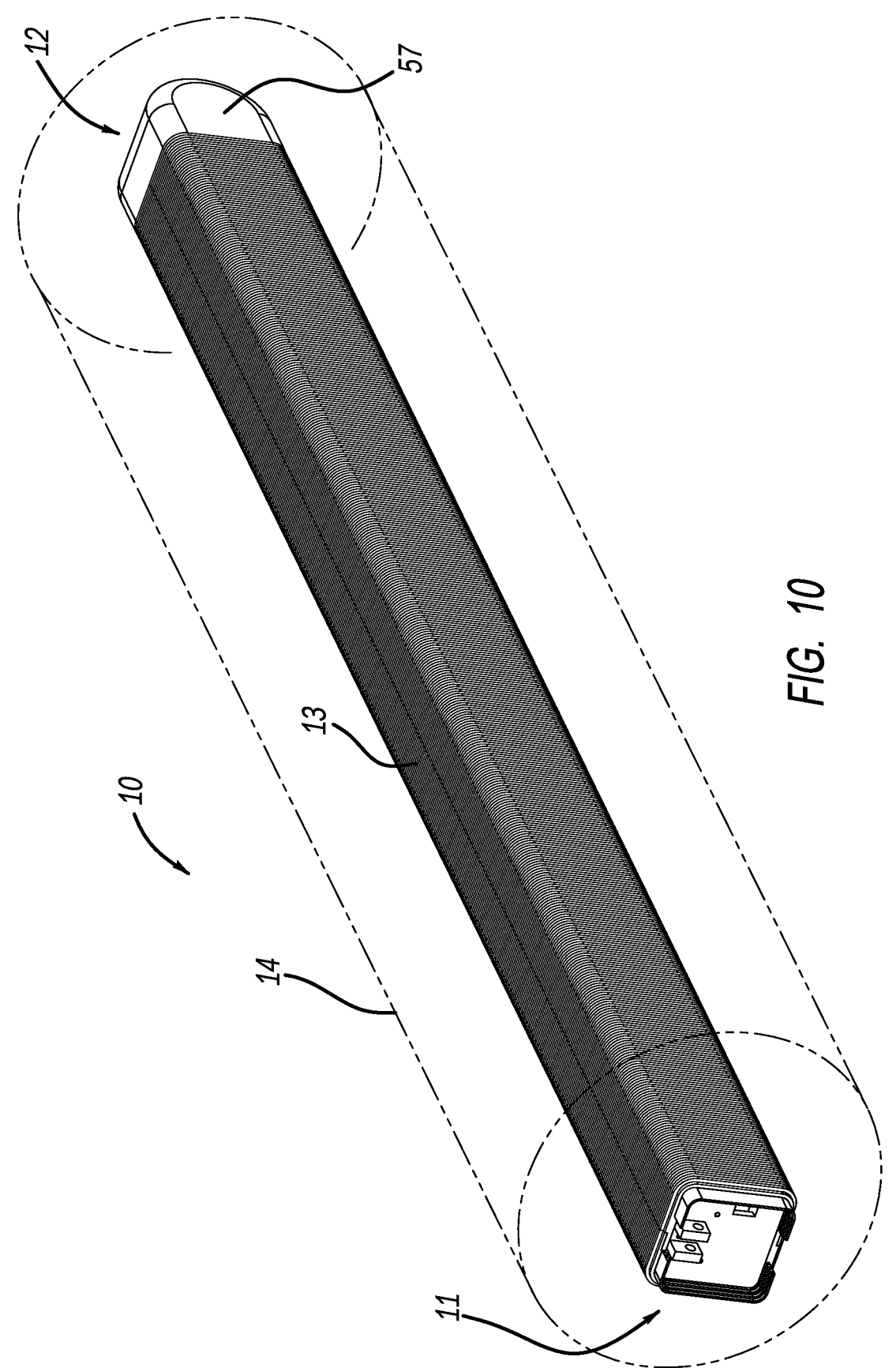
FIG. 10 is a perspective view showing another exemplary embodiment of the present amphibious snake robot.

FIG. 10 illustrates another exemplary embodiment of the robotic snake 10. The flexible body 13 of the robotic snake 10 extends from the first end 11 to the second end 12. In at least one exemplary embodiment, the first end 11 of the robotic snake 10 is configured to receive the camera 15 and/or the one or more sensors 17. For example, the camera 15 and the one or more sensors 17 may be coupled adjacent to the first end 11 of the flexible body 13. The flexible body 13 may also include the electronics section 27, the transmitter and receiver 19, the buoyancy controller 28, and a power source, as discussed above with respect to FIGS. 1-5. In at least one exemplary embodiment, the second end 12 of the robotic snake 10 includes an end cap 57, as will be discussed below with respect to FIG. 13. In another exemplary embodiment, the end cap 57 may be coupled to the first end 11, and the second end 12 may be configured to receive one or more of the camera 15, the sensors 17, and the transmitter and receiver 19. In other example embodiments, both the first end 11 and the second end 12 may include the end cap 57. In still other exemplary embodiments, the first end 11 and the second end 12 may be configured to receive one or more of the camera 15, the sensors 17, and the transmitter and receiver 19.

Figure 11:
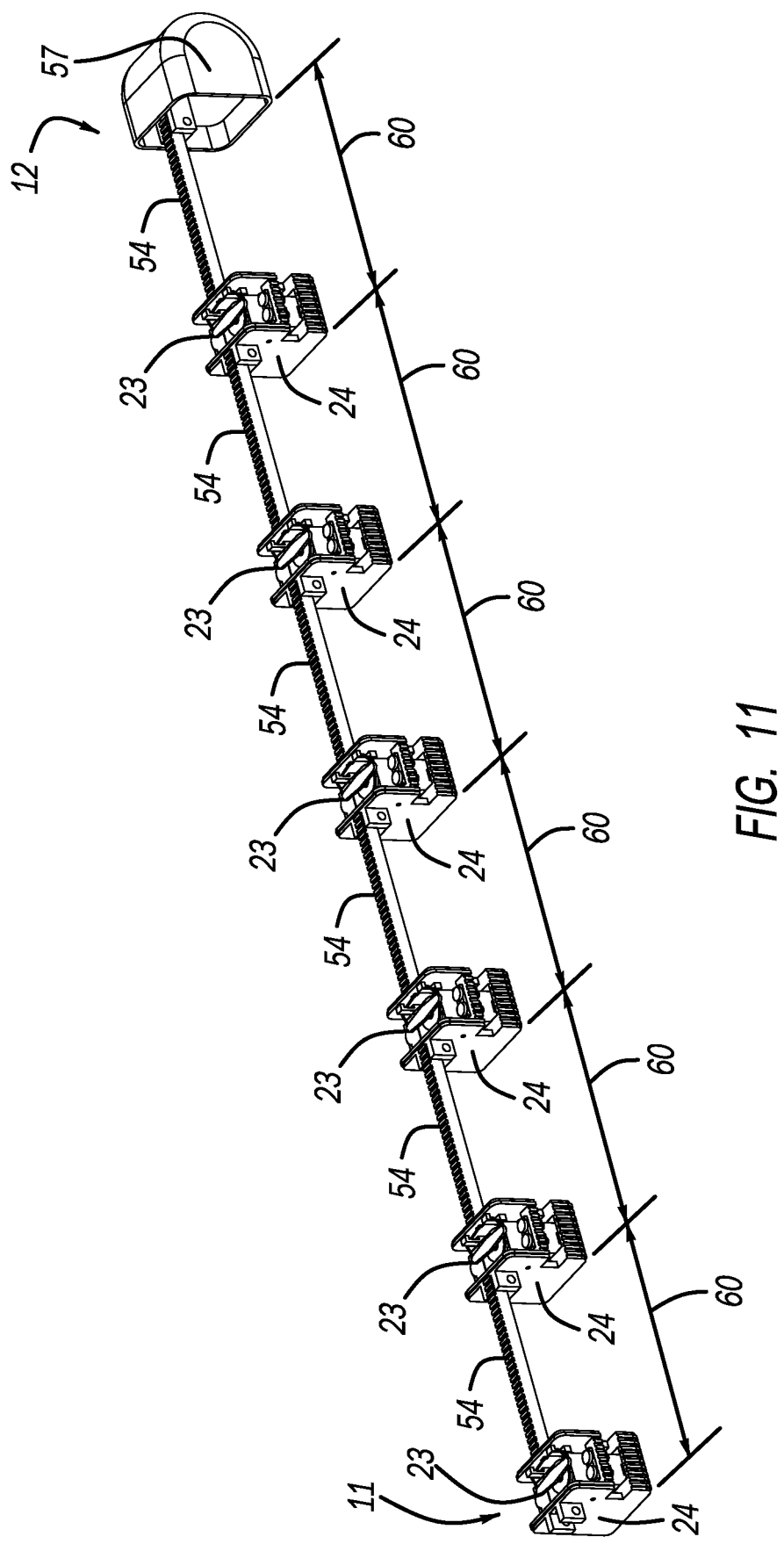
FIG. 11 is an interior, diagrammatic view of the amphibious snake robot of FIG. 10.
Figure 12:
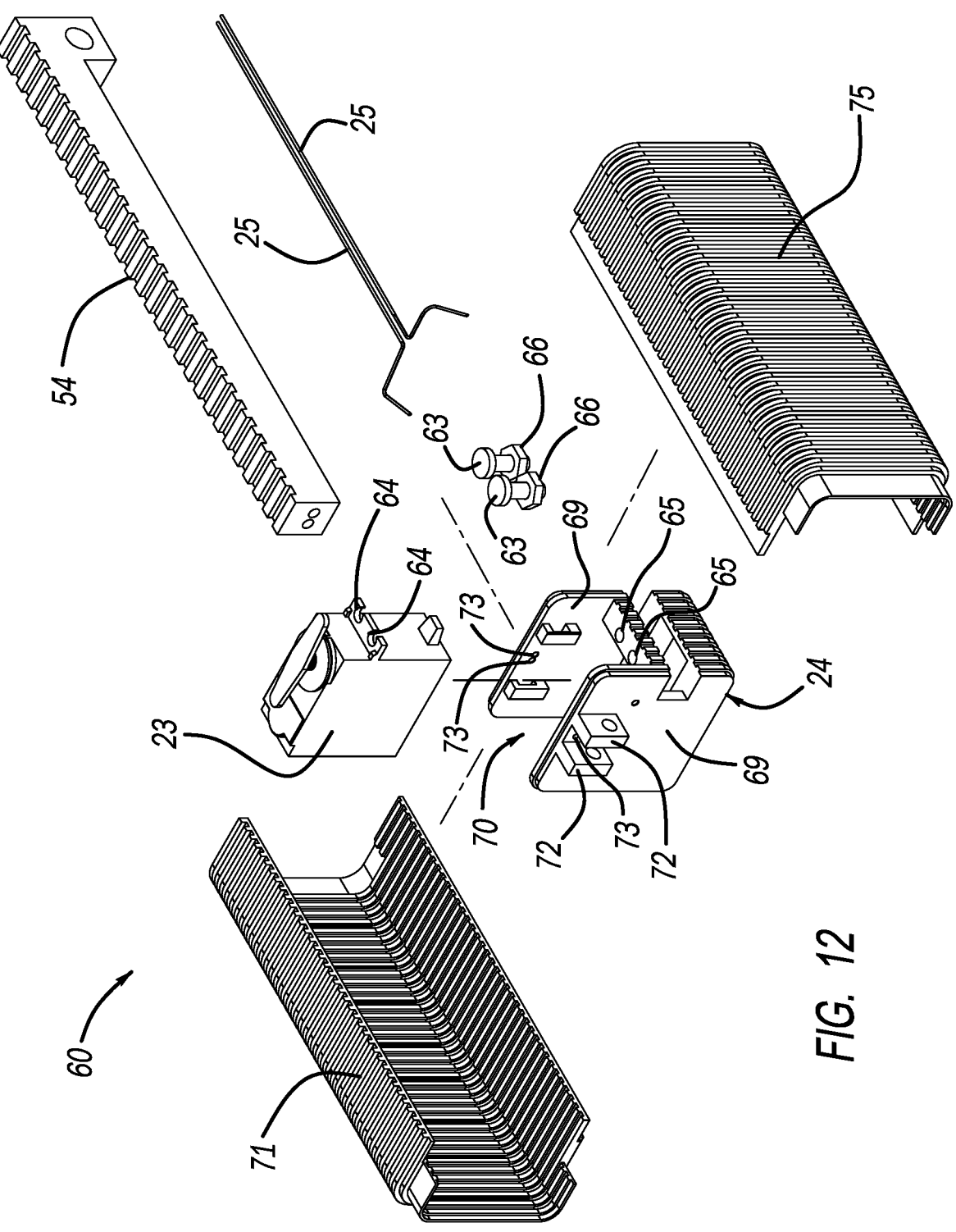
FIG. 12 is an exploded view of a first end of the amphibious snake robot of FIG. 10.
Figure 13:
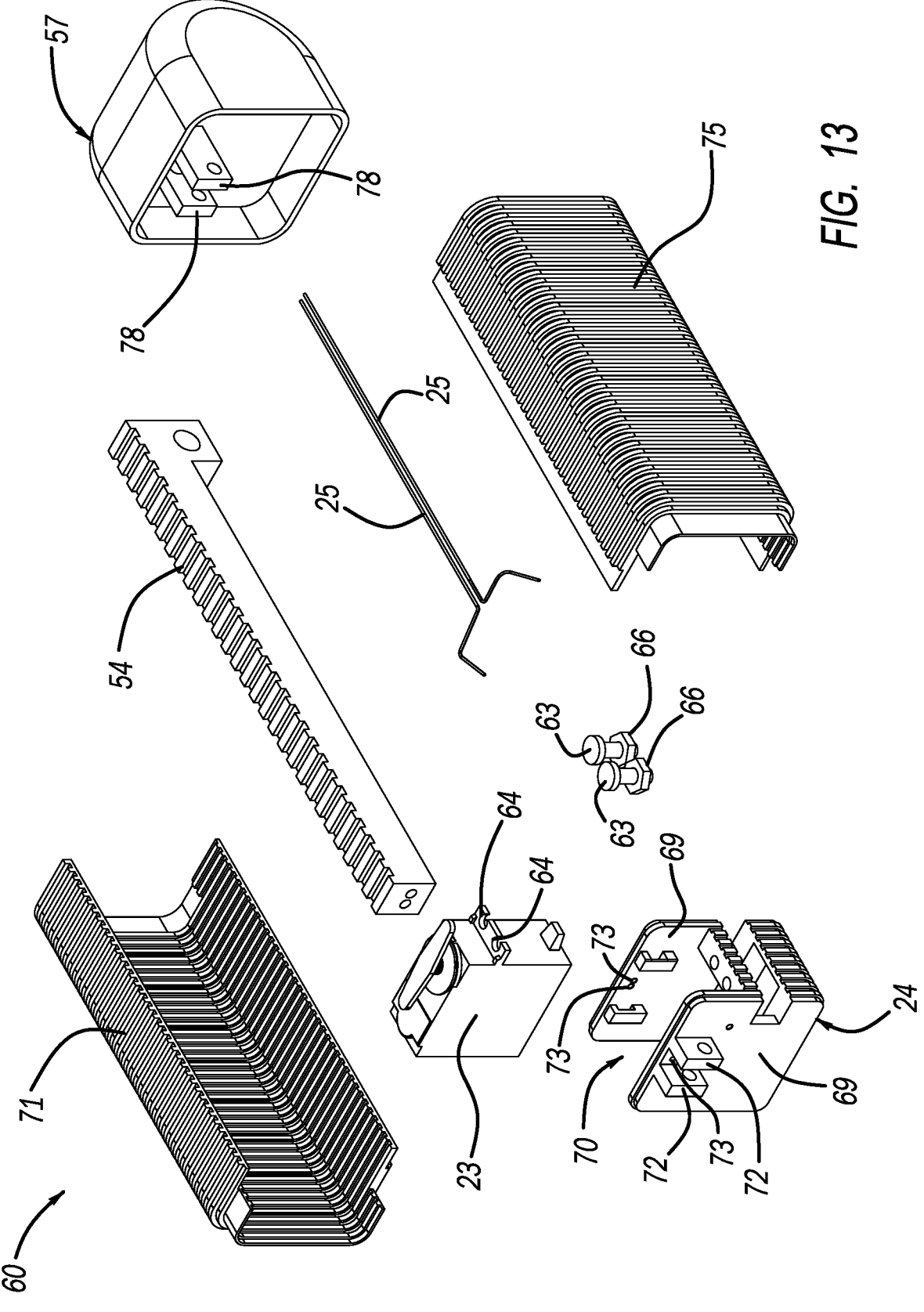
FIG. 13 is an exploded view of a second end of the amphibious snake robot of FIG. 10.

FIGS. 11-13 illustrate additional details that may be associated with the robotic snake of FIG. 10. With reference to FIG. 11, the robotic snake 10 includes actuators, such as motors 23, spaced apart along a length of the flexible body 13. The motors 23 are configured to move the flexible body 13 of the robotic snake 10 in a serpentine or concertina motion on land and in water. Each of the motors 23 may be positioned on a base or mount, such as mount 24. The robotic snake 10 also includes at least one cable, such as cables 25 (shown in FIGS. 12 and 13), coupled to the motors 23. Each of the cables 25 are guided by a flexible backbone 54. For example, the flexible backbone 54 is coupled to the cables 25. The flexible backbone 54 is configured to provide sufficient stiffness and structure along the length of the robotic snake 10 while also enabling the flexible body 13 to bend and create the serpentine motion when one of the motors 23 pulls one of the cables 25 and another of the cables 25 is released. In some exemplary embodiments, at least one side of the flexible backbone 54 may comprise a corrugated or bellows shape in some. For example, the corrugated shape of the flexible backbone 54 may be configured to match the corrugated shape of the flexible body 13. The flexible backbone 54 may also comprise a silicone material. Additionally, the flexible backbone 54 may comprise a flexible 3D-printed material, such as a thermoplastic polyurethane material, for example.

In at least one example embodiment, the robotic snake 10 includes a plurality of body segments 60 between the first end 11 and the second end 12. With reference to FIGS. 12 and 13, each of the body segments 60 includes the motor 23, the mount 24, the cables 25, and the flexible backbone 54. In at least one exemplary embodiment, each of the body segments 60 include one or more fasteners, such as at least one bolt 63 and at least one nut 66, configured to secure the motor 23 to the mount 24. For example, the motor 23 may define one or more motor holes 64 and the mount 24 may define one or more mount holes 65. The one or more motor holes 64 are configured to align with the one or more mount holes 65 such that the motor holes 64 and the mount holes 65 are configured to receive at least a portion of the at least one bolt 63. The at least one nut 66 may be positioned or screwed onto the at least one bolt 63 such that the motor 23 is secured to the mount 24.

In at least one exemplary embodiment, each mount 24 includes at least one plate 69 and at least one anchor 72 extending from an exterior surface of the plate 69. For example, each mount 24 may include two opposing plates defining an opening 70 configured to receive one of the motors 23. Each of the cables 25 are configured to be coupled between the motor 23 and another motor 23 of an adjacent body segments 60. For example, the cables 25 may extend through the one or more holes 73 in the plates 69. In some exemplary embodiments, each of the cables 25 may be configured to be coupled between the motor 23 and the at least one anchor 72 of the mount 24 in an adjacent one of the body segments 60. For example, the cables 25 may include at least two cables, as shown in FIGS. 12-13. First ends of each of the cables 25 may be coupled to a portion of the motor 23 and second ends of each of the cables 25 may be couped to the anchor 72 of an adjacent body segment 60. In another exemplary embodiment, the cable 25 may include a single cable with ends of the cable 25 coupled to an anchor 72 of an adjacent body segment 60 and a middle portion of the cable 25 coupled to the motor 23.

In at least one exemplary embodiment, the ends of the cables 25 are attached to the one or more anchors 72 and the one or more anchors 72 may be equidistantly spaced apart from edges of the plate 69 such that when the motor 23 actuates one of the cables 25 in a first direction, the mount 24 is pulled in the first direction. Likewise, when the motor 23 actuates another one of the cables 25 in a second direction, the mount 24 is pulled in the second direction. Such motion in each of the body segments 60 creates the serpentine motion that propels the robotic snake forward or backward.

In at least one exemplary embodiment, each of the plurality of body segments 60 include at least one cover defining an interior space including the motor 23, the mount 24, the cables 25, and the flexible backbone 54. For example, the cover of each of the plurality of body segments 60 includes a first portion 71 and a second portion 75 configured to be coupled and define the interior space. The mount 24 of each of the plurality of body segments 60 is configured to be coupled to one or both of the first portion 71 and the second portion 75. The cover, including the first portion 71 and the second portion 75, may have a corrugated shape. In at least one example embodiment, the first portion 71 and the second portion 75 are manufactured by molding and casting. In at least one example embodiment, the first portion 71 and the second portion 75 are fastened together by adhesive bonding, sonic welding, heat staking or the like, and sealed to keep out water. Additionally, adjacent body segments 60 are bonded together to achieve a desired length of the robotic snake 10.

With reference to FIG. 13, the second end 12 of the robotic snake 10 includes the end cap 57. In at least one exemplary embodiment, the end cap 57 includes one or more end anchors 78 extending from an interior surface of the end cap 57. Ends of the cables 25 of a last one of the body segments 60 connected in a series are configured to be coupled to the end anchor 78.

While various embodiments of the present invention have been disclosed, it should also be appreciated that other variations may be employed. While maneuverability of a robotic snake through pipes, whether dry, partially dry, or submersed in water, may be described herein, it should be appreciated that maneuverability in other locations and across various terrains is possible, such as in a dirt or cemented ditch or retention pond, rather than the preferred enclosed pipe. It is also envisioned that additional or alternate components may be included in the present system. For example, additional sensors and motors may be employed. It should also be appreciated that any of the preceding embodiments and features thereof can be mixed and matched with any of the others in any combination depending upon the final product and processing characteristics desired. Variations are not to be regarded as a departure from the present disclosure, and all such modifications are intended to be included within the scope and spirit of the present invention.

The invention claimed is:

1. An amphibious robot, comprising:
an elongated flexible body;
actuators in the elongated flexible body and spaced apart along a length of the elongated flexible body, the actuators configured to move the elongated flexible body in a serpentine or concertina motion on land and in water;
a camera coupled adjacent to an end of the elongated flexible body;
at least one sensor coupled to the elongated flexible body;
a buoyancy adjuster located in the elongated flexible body, the buoyancy adjuster comprising:
(a) a pump;
(b) at least one tank fluidly coupled to the pump and extending at least partially along the length of the elongated flexible body; and
(c) the pump being configured to control water volume inside the at least one tank;

a power source coupled to the elongated flexible body and configured to power the actuators, the camera, the at least one sensor, and the buoyancy adjuster; and an electric controller configured to control the actuators and receive data from the at least one sensor.

2. The amphibious robot of claim 1, wherein the elongated flexible body includes a plurality of body segments.

3. The amphibious robot of claim 2, further comprising an end cap coupled to another end of the elongated flexible body.

4. The amphibious robot of claim 2, wherein each of the plurality of body segments comprises:

one of the actuators;

a cable coupled to the one of the actuators;

a flexible backbone coupled to the cable; and at least one cover defining an interior space including the one of the actuators, the cable, and the flexible backbone.

5. The amphibious robot of claim 4, wherein the at least one cover comprises a corrugated shape.

6. The amphibious robot of claim 4, wherein the at least one cover comprises:

a first portion; and a second portion, the first portion and the second portion configured to be coupled and define the interior space.

7. The amphibious robot of claim 4, wherein each of the actuators comprise:

an electric motor; and a base configured to receive the electric motor.

8. The amphibious robot of claim 7, wherein a first end of the cable is coupled to the electric motor and a second end of the cable is configured to be coupled to another base of an adjacent body segment.

9. The amphibious robot of claim 4, wherein the one of the actuators is configured to actuate the cable between a first direction and a second direction to move the elongated flexible body forward or backward in the serpentine or concertina motion on land and in water.

10. The amphibious robot of claim 1, wherein the elongated flexible body includes a first end and a second end, the elongated flexible body comprising:

a first body segment at the first end;

a second body segment at the second end; and one or more middle body segments coupled between the first body segment and the second body segment.

11. The amphibious robot of claim 10, wherein a respective actuator of the actuators is located respectively in each of the first body segment and the one or more middle body segments.

12. The amphibious robot of claim 10, wherein the first body segment and each of the one or more middle body segments comprise:

a cable anchor at an end of the one or more middle body segments; and a clamp at an end of the one or more middle body segments opposite the cable anchor, one of the actuators configured to be coupled to the clamp;

wherein a shape of the cable anchor corresponds to an inner perimeter of the one or more middle body segments.

13. The amphibious robot of claim 12, wherein the clamp comprises:

a wall portion; and a clamp portion coupled to the wall portion, the clamp portion defining an opening configured to receive at least a portion of the one of the actuators.

14. The amphibious robot of claim 12, further comprising a cable coupled to the one of the actuators, an end of the cable coupled to the cable anchor, the one of the actuators being configured to actuate the cable between a first direction and a second direction to move the flexible body forward or backward in the serpentine or concertina motion on land and in water.

15. The amphibious robot of claim 12, wherein the first body segment and each of the one or more middle body segments comprise a vertical wall extending from the cable anchor toward the one of the actuators.

16. The amphibious robot of claim 10, each of the first body segment, the second body segment, and the one or more middle body segments comprise:

a bottom portion; and a top portion configured to be coupled to the bottom portion.

17. The amphibious robot of claim 1, wherein the elongated flexible body comprises a corrugated shape.

18. The amphibious robot of claim 1, further comprising:

a transmitter and receiver coupled adjacent to an end of the elongated flexible body opposite the camera, the transmitter and receiver configured to send data to and receive data from an external device.

19. The amphibious robot of claim 1, further comprising cables coupled to the actuators, the actuators being configured to actuate the cables such that the elongated flexible body is configured to move in the serpentine or concertina motion on land and in water.

20. An amphibious robot, comprising:

an elongated flexible body having a first end and a second end, the elongated flexible body including a plurality of body segments;

an actuator located in one of the body segments;

at least one cable coupled to the actuator, the actuator configured to actuate the at least one cable between a first direction and a second direction to move the elongated flexible body in a serpentine or concertina motion on land and in water; and at least one cover defining an interior space within which are the actuator and the at least one cable.

21. The amphibious robot of claim 20, wherein the plurality of body segments comprise:

a first body segment at the first end;

a second body segment at the second end;

one or more middle body segments coupled between the first body segment and the second body segment; and multiples of the actuator being located respectively in the first body segment and the one or more middle body segments.

22. The amphibious robot of claim 20, further comprising:

one or more middle body segments;

a cable anchor at an end of the one or more middle body segments, ends of the at least one cable coupled to the cable anchor; and a clamp at an end of the one or more middle body segments opposite the cable anchor, the actuator being coupled to the clamp.

23. The amphibious robot of claim 20, wherein each of the plurality of body segments comprise a flexible backbone coupled to the at least one cable.

24. The amphibious robot of claim 20, further comprising a cap coupled to the second end of the elongated flexible body.

25. The amphibious robot of claim 20, wherein the actuator is an electric motor, the amphibious robot further comprising a base configured to receive the electric motor.

26. The amphibious robot of claim 25, wherein a first end of the at least one cable is coupled to the electric motor and a second end of the at least one cable is configured to be coupled to another base of another of the plurality of body segments.

27. The amphibious robot of claim 20, wherein the at least one cover comprises:

a first portion; and a second portion, the first portion and the second portion configured to be coupled and define the interior space.

28. The amphibious robot of claim 20, further comprising:

a camera coupled to an end of the elongated flexible body;

at least one sensor coupled to the elongated flexible body;

a buoyancy controller located in the elongated flexible body;

a power source coupled to the elongated flexible body and configured to power each actuator, the camera, the at least one sensor, and the buoyancy controller; and an electric controller configured to control each actuator and receive data from the at least one sensor;

wherein the buoyancy controller, power source, and electronic controller are within the interior space defined by the at least one cover.

29. An amphibious robot, comprising:

an elongated flexible body having a first end and a second end;

actuators in the elongated flexible body and spaced apart along a length of the elongated flexible body;

at least two cables coupled to a respective actuator of the actuators, the respective actuators configured to actuate the at least two cables such that the elongated flexible body is configured to move in a serpentine or concertina motion on land and in water;

a camera coupled adjacent to the first end of the elongated flexible body;

at least one sensor coupled to the elongated flexible body;

a buoyancy controller located in the elongated flexible body;

a power source coupled to the elongated flexible body and configured to power the actuators, the camera, the at least one sensor, and the buoyancy controller;

an electric controller configured to control the actuators and receive data from the at least one sensor; and a transmitter and receiver coupled adjacent to the second end of the elongated flexible body opposite the camera, the transmitter and receiver configured to send data to and receive data from an external device.

30. The amphibious robot of claim 29, wherein the buoyancy controller comprises:

a pump;

at least one tank fluidly coupled to the pump and extending at least partially along the length of the elongated flexible body; and the pump being configured to control water volume inside the at least one tank.

31. The amphibious robot of claim 29, further comprising:

one or more middle body segments;

a cable anchor at an end of the one or more middle body segments, a cable end coupled to the cable anchor; and a clamp at an end of the one or more middle body segments opposite the cable anchor, one of the actuators being coupled to the clamp.

32. The amphibious robot of claim 29, further comprising a flexible backbone having a corrugated or bellows shape, the flexible backbone being silicone or a polyurethane material.

* * * * *